(12) United States Patent
Ding et al.

(10) Patent No.: US 11,983,245 B2
(45) Date of Patent: May 14, 2024

(54) UNMANNED DRIVING BEHAVIOR DECISION-MAKING AND MODEL TRAINING (71) Applicant: Beijing Sankuai Online Technology Co., Ltd, Beijing (CN)

(72) Inventors: Shuguang Ding, Beijing (CN); Qin Han, Beijing (CN); Dongchun Ren, Beijing (CN); Sheng Fu, Beijing (CN); Deheng Qian, Beijing (CN)

(73) Assignee: Beijing Sankuai Online Technology Co., Ltd, Beijing (CN)

( * ) Notice: Subject to any disclaimer, the term of this patent is extended or adjusted under 35 U.S.C. 154(b) by 566 days.

(21) Appl. No.: 17/276,113

(22) PCT Filed: Sep. 4, 2019

(86) PCT No.: PCT/CN2019/104334
§ 371 (c)(1),
(2) Date: Mar. 12, 2021

(87) PCT Pub. No.: WO2020/052480
PCT Pub. Date: Mar. 19, 2020

(65) Prior Publication Data
US 2022/0051058 A1 Feb. 17, 2022

(30) Foreign Application Priority Data
Sep. 12, 2018 (CN) .......................... 201811062839.2

(51) Int. Cl.
*G06F 18/214* (2023.01)
*G06F 18/213* (2023.01)
*G06N 20/00* (2019.01)

(52) U.S. Cl.
CPC ........ *G06F 18/2155* (2023.01); *G06F 18/213* (2023.01); *G06N 20/00* (2019.01)

(58) Field of Classification Search
None
See application file for complete search history.

(56) References Cited

U.S. PATENT DOCUMENTS 8,417,648 B2 * 4/2013 Hido ..................... G06N 20/00
706/20
9,176,987 B1 11/2015 Peng et al.
(Continued)

FOREIGN PATENT DOCUMENTS

CN 101393608 A 3/2009
CN 101916376 A 12/2010
(Continued)

OTHER PUBLICATIONS

CN108596266A Machine English Translation (Year: 2018).*
(Continued)

*Primary Examiner* — Nancy Bitar
(74) *Attorney, Agent, or Firm* — Kilpatrick Townsend & Stockton LLP (57) ABSTRACT Various embodiments a method and apparatus for unmanned driving behavior decision-making and model training, and an electronic device. The method includes: acquiring sample data, wherein the sample data includes a sample image; extracting a sample feature vector corresponding to the sample data, wherein a feature vector of the sample image is extracted by manifold dimension reduction; and based on the sample feature vector, training by semi-supervised learning to obtain a target decision-making model, wherein the target decision-making model is used for decision-making classification.

15 Claims, 4 Drawing Sheets (56) References Cited

U.S. PATENT DOCUMENTS

| | | | | |
|---|---|---|---|---|
| 10,990,174 B2* | 4/2021 | Kaifosh | ................... | G06F 3/02 |
| 2008/0294590 A1 | 11/2008 | Gupta et al. | | |
| 2017/0330068 A1 | 11/2017 | Yu et al. | | |
| 2017/0357257 A1 | 12/2017 | Yang et al. | | |
| 2017/0361873 A1 | 12/2017 | Yu et al. | | |
| 2018/0067488 A1 | 3/2018 | Pollach et al. | | |

FOREIGN PATENT DOCUMENTS

| | | | | |
|---|---|---|---|---|
| CN | 103234767 | A | | 8/2013 |
| CN | 103336960 | A | | 10/2013 |
| CN | 104199788 | A | | 12/2014 |
| CN | 103234767 | A | * | 1/2016 |
| CN | 105528595 | A | | 4/2016 |
| CN | 106066644 | A | | 11/2016 |
| CN | 106080590 | A | | 11/2016 |
| CN | 106197424 | A | | 12/2016 |
| CN | 106294355 | A | | 1/2017 |
| CN | 106777891 | A | | 5/2017 |
| CN | 106951919 | A | | 7/2017 |
| CN | 107392230 | A | | 11/2017 |
| CN | 107909153 | A | | 4/2018 |
| CN | 107977629 | A | | 5/2018 |
| CN | 108009058 | A | | 5/2018 |
| CN | 108596266 | | * | 9/2018 |
| CN | 109299732 | A | | 2/2019 |
| RU | 182644 | U1 | | 8/2018 |

OTHER PUBLICATIONS

CN103234767A Machine English Translation (Year: 2016).*
State Intellectual Property Office of the People's Republic of China, Office Action and Search Report Issued in Application No. 2018110628392, dated Aug. 14, 2019, 15 pages, (Submitted with Machine Translation).
State Intellectual Property Office of the People's Republic of China, Office Action and Search Report Issued in Application No. 2018110628392, dated Nov. 6, 2019, 5 pages, (Submitted with Machine Translation).
ISA State Intellectual Property Office of the People's Republic of China, International Search Report Issued in Application No. PCT/CN2019/104334, dated Nov. 29, 2019, WIPO, 6 pages.
Ian J. Goodfellow et al, "Generative Adversarial Nets", arXiv:1406.2661v1 [stat.ML], Jun. 10, 2014, 9 pages.
Chris Urmson et al, "Autonomous Driving in Urban Environments: Boss and the Urban Challenge" Journal of Field Robotics 25(8), 425-466 (2008), Published online in Wiley InterScience (www.interscience.wiley.com). • DOI: 10.1002/rob.20255, 42 pages.
Wang Chang et al, "An Algorithm for State Identification of Lane Change and Curve Entry/Exit of Target Vehicle Based on ACC System" Automotive Engineering, 2017(vol. 39) No. 8, 6 pages.
Ian Goodfellow et al., "Generative Adversarial Networks (GANs)" OpenAI Research Scientist NIPS 2016 tutorial Barcelona, Dec. 4, 2016, 86 pages.

* cited by examiner

UNMANNED DRIVING BEHAVIOR DECISION-MAKING AND MODEL TRAINING

CROSS-REFERENCE

This application is a US National Stage of International Application No. PCT/CN2019/104334, filed Sep. 4, 2019, which claims priority to Chinese Patent Application No. 201811062839.2, filed on Sep. 12, 2018, and entitled "UNMANNED DRIVING BEHAVIOR DECISION-MAKING AND MODEL TRAINING", which are incorporated by reference herein in their entireties.

TECHNICAL FIELD

This application relates to the field of unmanned driving technologies, and more particularly, to a method and apparatus for unmanned driving behavior decision-making and model training, and an electronic device.

BACKGROUND

With the continuous development of unmanned driving technologies and artificial intelligence technologies, the artificial intelligence technologies have been deeply applied to the field of unmanned driving technologies. At present, an unmanned driving behavior decision-making model is usually trained by supervised learning. However, when the model is trained by supervised learning, a mass of sample data needs to be collected and labeled. However, huge human resources are consumed for collecting and labeling the mass of sample data, so that the model training efficiency is low. Moreover, since the sample data is difficult to be expanded, an accuracy of the trained model in behavior decision-making is low.

SUMMARY

In order to solve one of the above technical problems, this application provides a method and apparatus for unmanned driving behavior decision-making and model training, and an electronic device.

According to a first aspect, a method for training an unmanned driving decision-making model is provided, including:

acquiring sample data, wherein the sample data includes a sample image;

extracting a sample feature vector corresponding to the sample data, wherein a feature vector of the sample image is extracted by manifold dimension reduction; and based on the sample feature vector, training by semi-supervised learning to obtain a target decision-making model, wherein the target decision-making model is used for decision-making classification.

According to a second aspect, a method for unmanned driving behavior decision-making by using the target decision-making model in the above first aspect is provided, including:

acquiring currently collected target data used for unmanned driving behavior decision-making, wherein the target data includes a target image;

extracting a target feature vector corresponding to the target data, wherein a feature vector of the target image is extracted by manifold dimension reduction; and inputting the target feature vector into the target decision-making model to obtain a target decision-making result.

According to a third aspect, an apparatus for training an unmanned driving decision-making model is provided, including:

an acquisition module configured to acquire sample data, wherein the sample data includes a sample image;

an extraction module configured to extract a sample feature vector corresponding to the sample data, wherein a feature vector of the sample image is extracted by manifold dimension reduction; and a training module configured to, based on the sample feature vector, train by semi-supervised learning to obtain a target decision-making model, wherein the target decision-making model is used for decision-making classification.

According to a fourth aspect, an apparatus for unmanned driving behavior decision-making by using the target decision-making model in the above third aspect is provided, including:

an acquisition module configured to acquire currently collected target data used for unmanned driving behavior decision-making, wherein the target data includes a target image;

an extraction module configured to extract a target feature vector corresponding to the target data, wherein a feature vector of the target image is extracted by manifold dimension reduction; and a decision-making module configured to input the target feature vector into the target decision-making model to obtain a target decision-making result.

According to a fifth aspect, a computer-readable storage medium is provided. The storage medium stores a computer program that, when executed by a processor, implements the method described in the first aspect or the second aspect.

According to a sixth aspect, an electronic device is provided. The electronic device includes a memory, a processor, and a computer program stored on the memory and executable on the processor. When the processor executes the program, the method described in the first aspect or the second aspect is implemented.

It is to be understood that, the foregoing general descriptions and the following detailed descriptions are merely for illustration and explanation purposes and are not intended to limit this application.

BRIEF DESCRIPTION OF THE DRAWINGS

Accompanying drawings herein are incorporated into the specification and constitute a part of this specification, show embodiments that conform to this application, and are used for describing a principle of this application together with this specification.

DETAILED DESCRIPTION OF THE EMBODIMENTS

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations that are consistent with this application. On the contrary, the implementations are merely examples of devices and methods that are described in detail in the appended claims and that are consistent with some aspects of this application.

The terms used in this application are for the purpose of describing specific embodiments only and are not intended to limit this application. The singular forms of "a" and "the" used in this application and the appended claims are intended to include the plural forms as well, unless the context clearly indicates otherwise. It should be further understood that the term "and/or" used herein indicates and includes any or all possible combinations of one or more associated listed items.

It should be understood that although the terms such as "first," "second," and "third," may be used in this application to describe various information, the information should not be limited to these terms. These terms are merely used to distinguish between information of the same type. For example, without departing from the scope of this application, first information may also be referred to as second information, and similarly, second information may also be referred to as first information. Depending on the context, for example, the word "if" used herein may be interpreted as "while" or "when," or "in response to determination."

Figure 1:
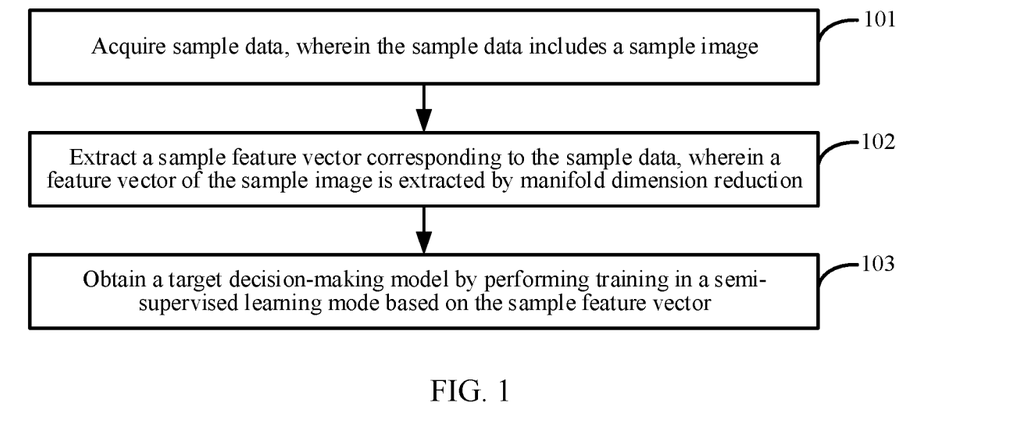
FIG. 1 is a flow chart of a method for training an unmanned driving decision-making model according to an exemplary embodiment of this application.

As shown in FIG. 1, FIG. 1 is a flow chart of a method for training an unmanned driving decision-making model according to an exemplary embodiment. The method may be applied to a terminal device, and may also be applied to a server. The method includes the following steps.

In step 101, sample data is acquired, wherein the sample data includes a sample image.

In this embodiment, the sample data used for unmanned driving behavior decision-making may be acquired first, and the sample data may be collected by various data collection apparatuses installed on an unmanned driving device (such as an unmanned vehicle, an unmanned robot, an unmanned aerial vehicle, an unmanned ship, or the like). The data collection apparatus installed on the unmanned driving device may at least include an image collection apparatus. Therefore, the sample data at least includes the sample image collected by the above image collection apparatus. In some embodiments, the data collection apparatus installed on the unmanned driving device may also include but is not limited to a laser radar, a millimeter wave radar, an ultrasonic radar, an inertial measurement unit, and the like. Therefore, the sample data may also include but is not limited to range data of a drivable area, position data of an obstacle, motion state information of the unmanned driving device, and the like.

It should be noted that the sample data may be divided into multiple groups, and each group of sample data consists of data collected by different data collection apparatuses at the same time. At least some groups of sample data may be labeled, each group of sample data labeled corresponds to a behavior decision-making label, and each behavior decision-making label may correspond to one behavior decision-making. For example, the behavior decision-making may be going forward, going backward, turning left, turning right, driving at a constant speed, stopping, following a target, or the like. It can be understood that the behavior decision-making may also be other types of decision-makings, and a specific type of the behavior decision-making is not limited in this application.

In step 102, a sample feature vector corresponding to the above sample data is extracted, wherein a feature vector of the sample image is extracted by manifold dimension reduction.

In this embodiment, based on an example type of the above sample data, the sample feature vector corresponding to the above sample data may be extracted in a corresponding and reasonable way to obtain multiple groups of sample feature vectors.

The feature vector of the sample image needs to be extracted by manifold dimension reduction. Specifically, a manifold may be constructed according to a continuity between each frame of sample image (the sample image is continuously collected), and the manifold dimension reduction is performed to obtain the image feature vector in a matrix form. It can be understood that the feature vector of the sample image may be extracted by using any reasonable manifold dimension reduction method. Any manifold dimension reduction method known in the art and possibly appeared in the future may be applied to this application, which is not limited in this application.

In step 103, based on the above sample feature vector, training is performed by semi-supervised learning to obtain a target decision-making model.

In this embodiment, based on the above sample feature vector, training may be performed by semi-supervised learning to obtain the target decision-making model, wherein the target decision-making model may be used for decision-making classification. Specifically, in one implementation, the following steps may be iteratively executed until it is determined that a stop condition is satisfied: a first virtual feature vector is generated by using a current generator first, and then the current generator is updated based on the first virtual feature vector. Then, a second virtual feature vector is generated by using the updated generator, and then a current decision-making model is updated based on the above sample feature vector and the second virtual feature vector.

In this embodiment, when it is determined that the stop condition is satisfied, iteration is stopped, and the iterated and updated decision-making model is outputted as the target decision-making model. When it is determined that a loss function is converged, it is determined that the stop condition is satisfied. The loss function may be a weighted sum of a first function, a second function, and a third function. For example, the loss function may be represented by the following formula (1):

$$L = aE_F(z) + bE_T^1(x) + cE_T^2(x) \qquad (1)$$

wherein L is the loss function, $E_F(z)$ is the first function, and $E_F(z)$ represents a mathematical expectation function that an authenticity attribute of the second virtual feature vector is judged to be an incorrect result by the current decision-making model. $E_T^1(x)$ is the second function, and $E_T^1(x)$) represents a mathematical expectation function that an authenticity attribute of the sample feature vector is judged to be a correct result by the current decision-making model. $E_T^2(x)$ is the third function, and $E_T^2(x)$ represents a mathematical expectation function that a result of decision-making classification of the sample feature vector is judged to be a correct result by the current decision-making model. a, b, and c are respectively weight coefficients of the first function, the second function, and the third function, wherein a, b, and c may be empirical values set according to experience, and specific values of the weight coefficients are not limited in this application.

It should be noted that since the second virtual feature vector is generated by the updated generator, the second virtual feature vector is not true data, so that the authenticity attribute of the second virtual feature vector is false data. If the second virtual feature vector is judged to be the true data by the current decision-making model, it is indicated that the judgment result is the incorrect result. If the second virtual feature vector is judged to be the false data by the current decision-making model, it is indicated that the judgment result is the correct result.

It should be noted that since the sample feature vector is obtained based on collected true data, the sample feature vector belongs to true data, so that the authenticity attribute of the sample feature vector is the true data. If the sample feature vector is judged to be the true data by the current decision-making model, it is indicated that the judgment result is the correct result. If the sample feature vector is judged to be the false data by the current decision-making model, it is indicated that the judgment result is the incorrect result.

It should be noted that since some labeled sample feature vectors all correspond to behavior decision-making labels, if a result of decision-making classification of the labeled sample feature vector by the current decision-making model is the same as the decision-making label corresponding to the sample feature vector, then it is indicated that the judgment result is the correct result. If the result of decision-making classification of the labeled sample feature vector by the current decision-making model is different from the decision-making label corresponding to the sample feature vector, then it is indicated that the judgment result is the incorrect result.

In another implementation, the following steps may also be iteratively executed until it is determined that a stop condition is satisfied: a virtual feature vector is generated by using a current generator first, and then the current generator and the current decision-making model are simultaneously updated based on the virtual feature vector and the above sample feature vector. When it is determined that a loss function is converged, it is determined that the stop condition is satisfied. The loss function is similar to the loss function in the previous implementation in principle, which will not be repeated here.

According to a method for training the unmanned driving decision-making model provided by the above embodiment of this application, sample data is acquired, wherein the sample data includes a sample image; a sample feature vector corresponding to the above sample data is extracted, wherein a feature vector of the sample image is extracted by manifold dimension reduction; and based on the above sample feature vector, training is performed by semi-supervised learning to obtain a target decision-making model, wherein the target decision-making model is used for decision-making classification. In this embodiment, it is unnecessary to collect a mass of sample data, and it is unnecessary to label the mass of sample data, thus saving human resources and improving an efficiency of model training. Meanwhile, a decision-making result of the trained model is more accurate in behavior decision-making.

It should be noted that although a method for training the model by semi-supervised learning exists in the prior art, no relevant application is provided in the unmanned driving behavior decision-making. Because in an aspect of unmanned driving behavior decision-making, visual image data is usually used as input data of the model, and the generator needs to generate the input data of the mode in the model training by the semi-supervised learning. Since it is difficult for the generator to efficiently generate a mass of visual image data commonly used in the prior art, there is a certain technical obstacle in applying the model training by semi-supervised learning to the unmanned driving field in the prior art. However, in the technical solution of this application, the visual image data is processed into a feature vector in a matrix form by manifold dimension reduction, so that the generator is capable of efficiently generating the feature vector in the matrix form corresponding to the visual image data. Therefore, this application applies the model training by semi-supervised learning to the unmanned driving behavior decision-making by overcoming the above technical obstacle, and the technical problem to be solved in this application is solved.

Figure 2:
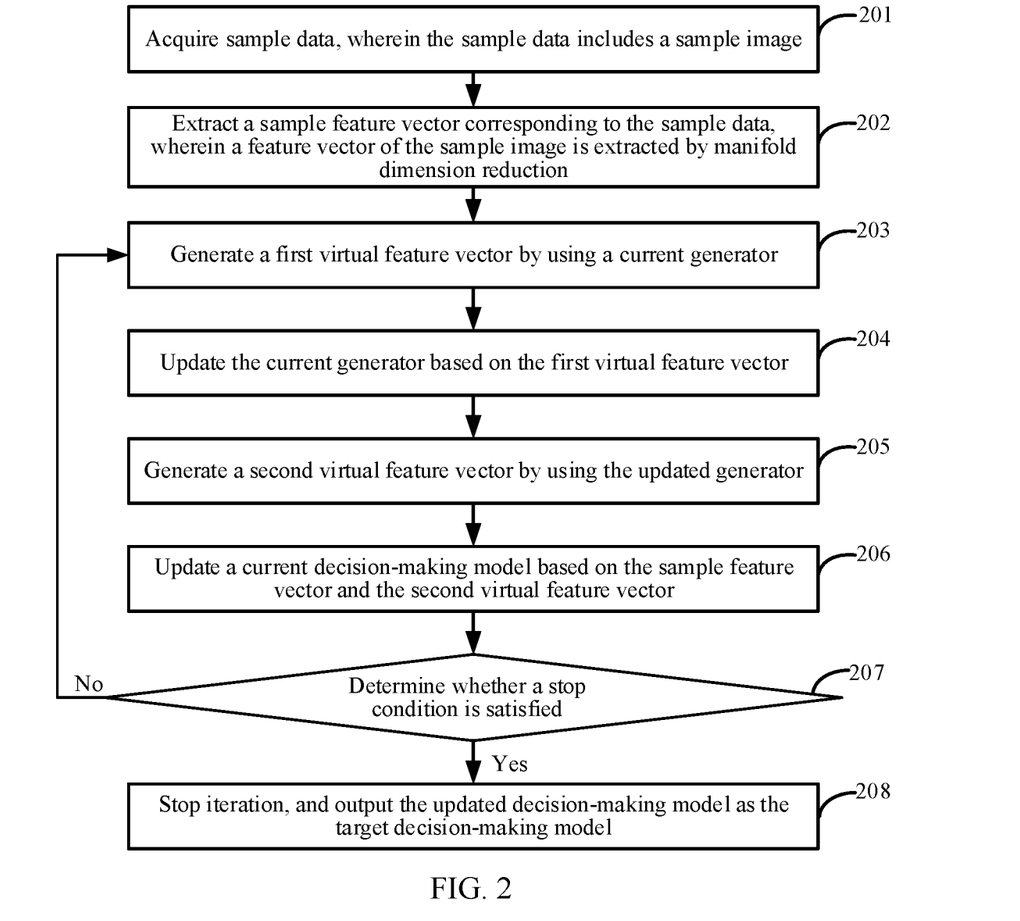
FIG. 2 is a flow chart of another method for training an unmanned driving decision-making model according to an exemplary embodiment of this application.

As shown in FIG. 2, FIG. 2 is a flow chart of another method for training an unmanned driving decision-making model according to an exemplary embodiment, the embodiment describes a process of training to obtain a target decision-making model, and the method may be applied to a terminal device, and may also be applied to a server, including the following steps.

In step 201, sample data is acquired, wherein the sample data includes a sample image.

In step 202, a sample feature vector corresponding to the above sample data is extracted, wherein a feature vector of the sample image is extracted by manifold dimension reduction.

In step 203, a first virtual feature vector is generated by using a current generator.

In this embodiment, the current generator may be a generator which is being trained, and a random noise signal may be acquired and inputted into the generator, so that the generator generates the first virtual feature vector. It should be noted that the generator may generate multiple groups of first virtual feature vectors, and each group of first virtual feature vectors has the same dimension as the sample feature vector.

In this embodiment, the generator may be any encoder capable of encoding and generating the virtual feature vector, and a specific type of the generator is not limited in this application.

In step 204, the current generator is updated based on the first virtual feature vector.

In this embodiment, the current generator may be updated based on the first virtual feature vector, so that the first virtual feature vector generated by the updated generator is as close as possible to the sample feature vector. Specifically, the current generator may be updated based on the first virtual feature vector in the following way: the first virtual feature vector may be inputted into the current decision-making model first to obtain a first output content. The first output content may include a first result of judging an authenticity attribute of the first virtual feature vector by the current decision-making model. The authenticity attribute of the first virtual feature vector is false data. Therefore, if the first virtual feature vector is judged to be true data by the current decision-making model, it is indicated that the judgment result is the incorrect result. If the first virtual feature vector is judged to be the false data by the current decision-making model, it is indicated that the judgment result is the correct result.

Then, parameters of the current generator are adjusted according to the first output content to update the current generator. Specifically, a first index may be determined according to the first output content, wherein the first index is a mathematical expectation that the first result is the incorrect result, and then the parameters of the current generator may be adjusted by using the first index. For example, according to the first index and the loss function, an adjustment direction of the parameters of the generator may be determined by a gradient descent method (such as increasing the parameters or decreasing the parameters), and then the parameters of the generator are adjusted according to the adjustment direction, so that the first virtual feature vector generated by the updated generator is as close as possible to the sample feature vector.

In step 205, a second virtual feature vector is generated by using the updated generator.

In step 206, a current decision-making model is updated based on the above sample feature vector and the above second virtual feature vector.

In this embodiment, a second virtual feature vector may be generated by using the updated generator, and then a current decision-making model is updated based on the above sample feature vector and the second virtual feature vector. Specifically, the current decision-making model may be updated based on the above sample feature vector and the second virtual feature vector in the following way: the sample feature vector and the second virtual feature vector are inputted into the current decision-making model to obtain a second output content. The second output content may include a second result of judging an authenticity attribute of the second virtual feature vector, a third result of judging an authenticity attribute of the sample feature vector, and a fourth result of decision-making classification of the sample feature vector.

The authenticity attribute of the second virtual feature vector is false data. Therefore, if the second virtual feature vector is judged to be true data by the current decision-making model, it is indicated that the judgment result is the incorrect result. If the second virtual feature vector is judged to be the false data by the current decision-making model, it is indicated that the judgment result is the correct result. The authenticity attribute of the sample feature vector is true data. Therefore, if the sample feature vector is judged to be the true data by the current decision-making model, it is indicated that the judgment result is the correct result. If the second virtual feature vector is judged to be the false data by the current decision-making model, it is indicated that the judgment result is the incorrect result. Moreover, labeled sample feature vectors all correspond to behavior decision-making labels, if a result of the decision-making classification of the labeled sample feature vector by the current decision-making model is the same as the decision-making label corresponding to the sample feature vector, then it is indicated that the judgment result is the correct result. If the result of decision-making classification of the labeled sample feature vector by the current decision-making model is different from the decision-making label corresponding to the sample feature vector, then it is indicated that the judgment result is the incorrect result.

Then, parameters of the current decision-making model may be adjusted according to the second output content to update the current decision-making model. Specifically, a second index and a third index may be determined according to the second output content, wherein the second index is a sum of a mathematical expectation that the second result is an incorrect result and a mathematical expectation that the third result is a correct result, and the third index is a mathematical expectation that the fourth result is a correct result. Then, parameters of the current decision-making model may be adjusted by using the second index and the third index. For example, according to the second index, the third index, and the loss function, an adjustment direction of the parameters of the generator may be determined by a gradient descent method, and then the parameters of the generator are adjusted according to the adjustment direction, In this embodiment, the decision-making model may be a classifier well known to those skilled in the art, and a specific type of the decision-making model is not limited in this application.

In step 207, whether a stop condition is satisfied is judged.

In step 208, when it is determined that the stop condition is satisfied, iteration is stopped, and the iterated and updated decision-making model is outputted as the target decision-making model. When it is determined that the stop condition is satisfied, steps 203 to 207 are executed again It should be noted that the same steps as those in this embodiment of FIG. 1 will not be repeated in the above embodiment of FIG. 2, and related contents can be referred to the embodiment of FIG. 1.

According to the method for training the unmanned driving decision-making model provided by the above embodiment, the following steps are iteratively executed until the stop condition is satisfied: the first virtual feature vector is generated by using the current generator, the current generator is updated based on the first virtual feature vector, the second virtual feature vector is generated by using the updated generator, and the current decision-making model is updated based on the sample feature vector and the second virtual feature vector. When it is determined that the stop condition is satisfied, iteration is stopped, and the iterated and updated decision-making model is outputted as the target decision-making model. In this embodiment, in each iteration cycle, the generator is updated first, and then the decision-making model is updated by using the virtual feature vector and the sample feature vector generated by the updated generator, thus improving an efficiency of model training, and also making a decision-making result obtained in behavior decision-making of the trained model more accurate.

Figure 3:
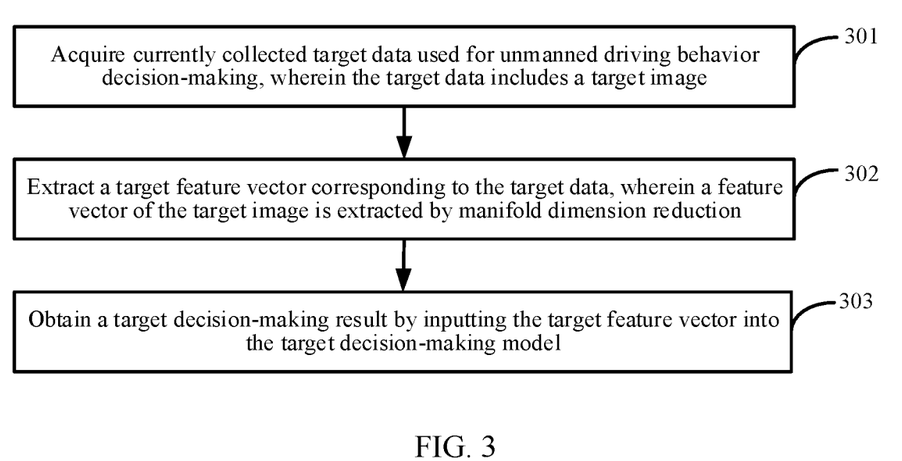
FIG. 3 is a flow chart of a method for unmanned driving behavior decision-making according to an exemplary embodiment of this application.

As shown in FIG. 3, FIG. 3 is a flow chart of a method for unmanned driving behavior decision-making according to an exemplary embodiment, and the method may be applied to an unmanned driving device. Those skilled in the art can understand that the unmanned driving device may include but is not limited to an unmanned vehicle, an unmanned robot, an unmanned aerial vehicle, an unmanned ship, and the like. The method includes the following steps.

In step 301, currently collected target data used for unmanned driving behavior decision-making is acquired, wherein the target data includes a target image.

In this embodiment, the currently collected target data used for unmanned driving behavior decision-making may be acquired first, and the target data may be collected by various data collection apparatuses installed on the unmanned driving device. The data collection apparatus installed on the unmanned driving device may at least include an image collection apparatus. Therefore, the target data at least includes the target image collected by the above image collection apparatus.

In some embodiments, the data collection apparatus installed on the unmanned driving device may also include but is not limited to a laser radar, a millimeter wave radar, an ultrasonic radar, an inertial measurement unit, and the like. Therefore, the target data may also include but is not limited to current range data of a drivable area, current position data of an obstacle, current motion state information of the unmanned driving device, and the like.

In step 302, a target feature vector corresponding to the target data is extracted, wherein a feature vector of the target image is extracted by manifold dimension reduction.

In this embodiment, based on a specific type of the above target data, the sample feature vector corresponding to the above target data may be extracted in a corresponding and reasonable way. The feature vector of the target image needs to be extracted by manifold dimension reduction.

For example, a manifold may be constructed according to a continuity between each frame of target image, and the manifold dimension reduction is performed to obtain an image feature vector in a matrix form. It can be understood that the feature vector of the target image may be extracted by using any reasonable manifold dimension reduction method. Any manifold dimension reduction method known in the art and possibly appeared in the future may be applied to this application, which is not limited in this application.

In step 303, the target feature vector is inputted into the target decision-making model to obtain a target decision-making result.

In this embodiment, the target decision-making model is a pre-trained model, and the target decision-making model may be specifically trained in the way described in this embodiment of FIG. 1 or FIG. 2, which will not be repeated in this embodiment. The target feature vector may be inputted into the target decision-making model to obtain the target decision-making result.

In this embodiment, the target decision-making result may include one behavior decision-making. For example, the behavior decision-making may be going forward, going backward, turning left, turning right, driving at a constant speed, stopping, following a target, or the like. It can be understood that the behavior decision-making may also be other types of decision-makings, and a specific type of the behavior decision-making is not limited in this application.

According to the method for the unmanned driving behavior decision-making provided by the above embodiment of this application, the currently collected target data used for unmanned driving behavior decision-making is acquired, wherein the target data includes a target image; a target feature vector corresponding to the target data is extracted, wherein a feature vector of the target image is extracted by manifold dimension reduction; and the target feature vector is inputted into the target decision-making model to obtain the target decision-making result. The target decision-making model is trained by the method described in the embodiment of FIG. 1 or FIG. 2, so that the obtain decision-making result is more accurate.

It should be noted that although the operations of the method of this application are described in a specific order in the foregoing embodiment, this does not require or imply that these operations must be performed in the specific order, or that all of the operations shown must be performed to achieve the expected results. Instead, the steps depicted in the flowchart may be executed in a different sequence. Additionally or alternatively, some steps may be omitted, a plurality of steps may be combined into one step for execution, and/or one step may be decomposed into a plurality of steps for execution.

Corresponding to the above embodiment of the method for the unmanned driving behavior decision-making and the model training, this application also provides an embodiment of an apparatus for unmanned driving behavior decision-making and model training.

Figure 4:
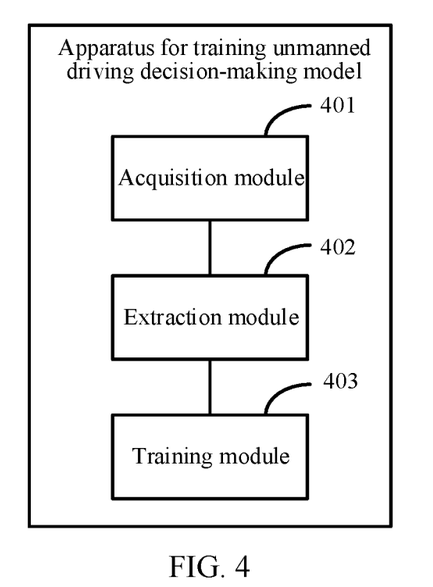
FIG. 4 is a block diagram of an apparatus for training an unmanned driving decision-making model according to an exemplary embodiment of this application.

As shown in FIG. 4, FIG. 4 is a block diagram of an apparatus for training an unmanned driving decision-making model according to an exemplary embodiment of this application, and the apparatus may include an acquisition module 401, an extraction module 402, and a training module 403.

The acquisition module 401 is configured to acquire sample data, wherein the sample data includes a sample image.

The extraction module 402 is configured to extract a sample feature vector corresponding to the sample data. A feature vector of the sample image is extracted by manifold dimension reduction.

The training module 403 is configured to, based on the sample feature vector, train the model by semi-supervised learning to obtain a target decision-making model, wherein the target decision-making model is used for decision-making classification.

Figure 5:
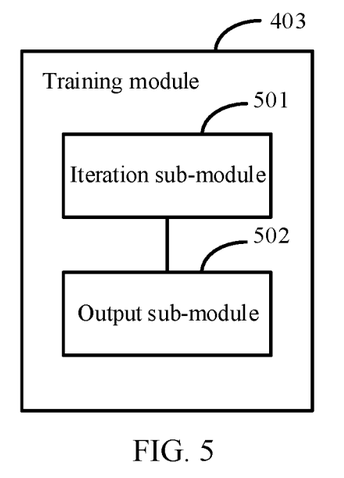
FIG. 5 is a block diagram of another apparatus for training an unmanned driving decision-making model according to an exemplary embodiment of this application.

As shown in FIG. 5, FIG. 5 is a block diagram of another apparatus for training an unmanned driving decision-making model according to an exemplary embodiment of this application, and based on the above embodiment shown in FIG. 4, the training module 403 may include an iteration sub-module 501 and an output sub-module 502 in this embodiment.

The iteration sub-module 501 is configured to iteratively execute the following steps: the first virtual feature vector is generated by using the current generator, the current generator is updated based on the first virtual feature vector, the second virtual feature vector is generated by using the updated generator, and the current decision-making model is updated based on the sample feature vector and the second virtual feature vector.

The output sub-module 502 is configured to, when it is determined that a stop condition is satisfied, stop iteration, and use the iterated and updated decision-making model as the target decision-making model.

In some embodiments, the iteration sub-module 501 is further configured to input the first virtual feature vector into the current decision-making model to obtain the first output content, and parameters of the current generator are adjusted according to the first output content to update the current generator. The first output content may include a first result of judging an authenticity attribute of the first virtual feature vector.

In other optional embodiments, the iteration sub-module 501 is further configured to determine a first index according to the first output content, and adjust parameters of the current generator by using the first index. The first index is a mathematical expectation that the first result is an incorrect result.

In other embodiments, the iteration sub-module 501 is further configured to input the sample feature vector and the second virtual feature vector into the current decision-making model to obtain the second output content, and adjust parameters of the current generator according to the second output content to update the current decision-making model. The second output content includes a second result of judging an authenticity attribute of the second virtual feature vector, a third result of judging an authenticity attribute of the sample feature vector, and a fourth result of decision-making classification of the sample feature vector.

In other embodiments, the iteration sub-module 501 is further configured to determine a second index and a third index according to the second output content, and adjust parameters of the current decision-making model by using the second index and the third index. The second index is a sum of a mathematical expectation that the second result is an incorrect result and a mathematical expectation that the third result is a correct result. The third index is a mathematical expectation that the fourth result is a correct result.

In other embodiments, the output sub-module 502 is further configured to, when it is determined that a loss function is converged, determine that the stop condition is satisfied.

The loss function is a weighted sum of a first function, a second function, and a third function.

The first function is a mathematical expectation function that an authenticity attribute of the second virtual feature vector is judged to be an incorrect result by the current decision-making model. The second function is a mathematical expectation function that an authenticity attribute of the sample feature vector is judged to be a correct result by the current decision-making model. The third function is a mathematical expectation function that a result of decision-making classification of the sample feature vector is judged to be a correct result by the current decision-making model.

It should be understood that the above apparatus may be preset in a terminal device or a server, or may be loaded into the terminal device or the server by downloading or the like. Corresponding modules in the above apparatus may be matched with modules in the terminal device or the server to implements a training solution of the unmanned driving decision-making model.

Figure 6:
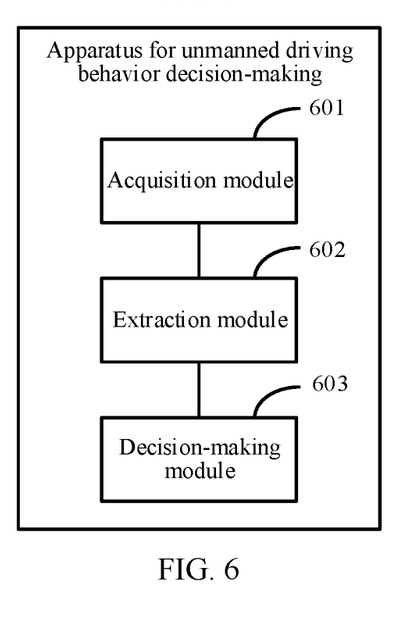
FIG. 6 is a block diagram of an apparatus for unmanned driving behavior decision-making according to an exemplary embodiment of this application.

As shown in FIG. 6, FIG. 6 is a block diagram of an apparatus for unmanned driving behavior decision-making by using the target decision-making model trained by the apparatus shown in FIG. 4 or FIG. 5 according to an exemplary embodiment of this application, and the apparatus may include an acquisition module 601, an extraction module 602, and a decision-making module 603.

An acquisition module 601 is configured to acquire currently collected target data used for unmanned driving behavior decision-making, wherein the target data includes a target image.

An extraction module 602 is configured to extract a target feature vector corresponding to the target data, wherein a feature vector of the target image is extracted by manifold dimension reduction.

A decision-making module 603 is configured to input the target feature vector into the target decision-making model to obtain a target decision-making result.

It should be understood that the above apparatus may be preset in the unmanned driving device, or may be loaded into the unmanned driving device by downloading or the like. Corresponding modules in the above apparatus may be matched with modules in the unmanned driving device to implement a solution of the unmanned driving behavior decision-making.

Because the apparatus embodiments basically correspond to the method embodiments, for related parts, reference may be made to the descriptions in the method embodiments. The foregoing described device embodiments are merely examples. The units described as separate parts may or may not be physically separate, and the parts displayed as units may or may not be physical units, may be located in one position, or may be distributed on a plurality of network units. Some of or all of the modules may be selected according to actual needs for achieving the objectives of the solutions of this application. A person of ordinary skill in the art may understand and implement the embodiments without creative efforts.

The embodiment of this application also provides a computer-readable storage medium. The storage medium stores a computer program that, when executed by a processor, implements the method for training the unmanned driving decision-making model or the method for the unmanned driving behavior decision-making provided in any one of the above embodiments of FIG. 1 to FIG. 3.

Figure 7:
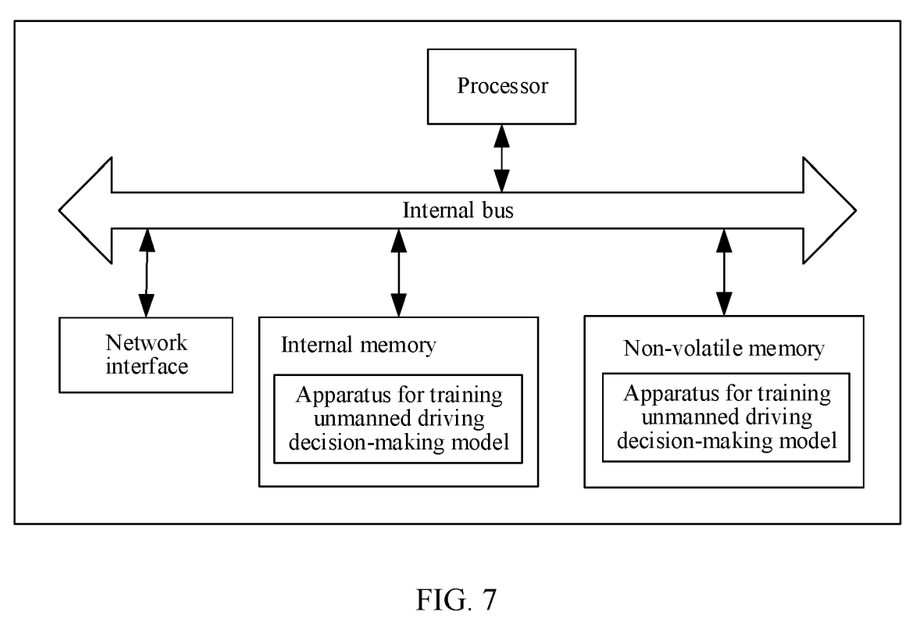
FIG. 7 is a schematic structural diagram of an electronic device according to an exemplary embodiment of this application.

Corresponding to the above method for training the unmanned driving decision-making model, the embodiment of this application also provides a schematic structural diagram of an electronic device according to an exemplary embodiment of this application as shown in FIG. 7. Referring to FIG. 7, at a hardware level, the electronic device includes a processor, an internal bus, a network interface, an internal memory, and a non-volatile memory, and may certainly further include hardware required for other services. The processor reads a corresponding computer program from the non-volatile memory into the internal memory and then runs the computer program, so that the apparatus for training the unmanned driving decision-making model is formed on a logical level. Definitely, in addition to a software implementation, this application does not exclude other implementations, for example, a logic device or a combination of software and hardware. In other words, an entity executing the following processing procedure is not limited to the logic units, and may also be hardware or logic devices.

Figure 8:
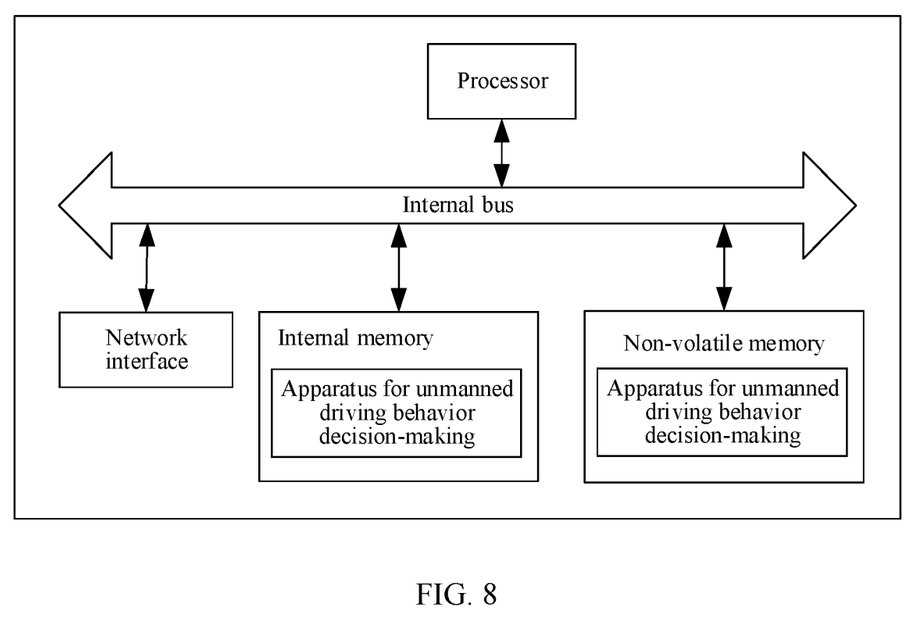
FIG. 8 is a schematic structural diagram of another electronic device according to an exemplary embodiment of this application.

Corresponding to the above method for the unmanned driving behavior decision-making, the embodiment of this application also provides a schematic structural diagram of an electronic device according to an exemplary embodiment of this application as shown in FIG. 8. Referring to FIG. 8, at a hardware level, the electronic device includes a processor, an internal bus, a network interface, an internal memory, and a non-volatile memory, and may certainly further include hardware required for other services. The processor reads a corresponding computer program from the non-volatile memory, into the internal memory and then runs the computer program, so that the apparatus for the unmanned driving behavior decision-making is formed on a logical level. Definitely, in addition to a software implementation, this application does not exclude other implementations, for example, a logic device or a combination of software and hardware. In other words, an entity executing the following processing procedure is not limited to the logic units, and may also be hardware or logic devices.

After considering the specification and practicing the present disclosure, a person skilled in the art may easily conceive of other implementations of this application. This application is intended to cover any variations, uses, or adaptive changes of this application. These variations, uses, or adaptive changes follow the general principles of this application and include common general knowledge or common technical means in the art, which are not disclosed in this application. The specification and the embodiments are considered as merely exemplary, and the scope and spirit of this application are pointed out in the following claims.

It should be understood that this application is not limited to the precise structures described above and shown in the accompanying drawings, and various modifications and changes can be made without departing from the scope of this application. The scope of this application is subject only to the appended claims.

The invention claimed is:

1. A computer implemented method for training an unmanned driving decision-making model, comprising:
   acquiring sample data, wherein the sample data comprises a sample image;
   extracting a sample feature vector corresponding to the sample data, wherein a feature vector of the sample image is extracted by manifold dimension reduction; and
   obtaining a target decision-making model by performing training in a semi-supervised learning mode based on the sample feature vector, wherein the target decision-making model is for decision-making classification.

2. The method according to claim 1, wherein obtaining the target decision-making model by performing training in a semi-supervised learning mode based on the sample feature vector comprises:
   performing iteration of the following:
      generating a first virtual feature vector by using a current generator;
      updating the current generator based on the first virtual feature vector;
      generating a second virtual feature vector by using the updated generator;
      updating a current decision-making model based on the sample feature vector and the second virtual feature vector; and
      when determining that a stop condition is satisfied, stopping the iteration, and using the updated decision-making model as the target decision-making model.

3. The method according to claim 2, wherein updating the current generator based on the first virtual feature vector comprises:
   obtaining first output content by inputting the first virtual feature vector into the current decision-making model, wherein the first output content comprises a first result of judging an authenticity attribute of the first virtual feature vector; and
   adjusting a parameter of the current generator according to the first output content to update the current generator.

4. The method according to claim 3, wherein adjusting the parameter of the current generator according to the first output content comprises:
   determining a first index according to the first output content, wherein the first index represents a mathematical expectation indicating that the first result is an incorrect result; and
   adjusting the parameter of the current generator by using the first index.

5. The method according to claim 2, wherein updating the current decision-making model based on the sample feature vector and the second virtual feature vector comprises:
   obtaining second output content by inputting the sample feature vector and the second virtual feature vector into the current decision-making model, wherein the second output content comprises a second result of judging an authenticity attribute of the second virtual feature vector, a third result of judging an authenticity attribute of the sample feature vector, and a fourth result of decision-making classification of the sample feature vector; and
   adjusting a parameter of the current decision-making model according to the second output content to update the current decision-making model.

6. The method according to claim 5, wherein adjusting the parameter of the current decision-making model according to the second output content comprises:
   determining a second index and a third index according to the second output content, wherein the second index represents a sum of a mathematical expectation indicating that the second result is an incorrect result and a mathematical expectation indicating that the third result is a correct result, and the third index represents a mathematical expectation indicating that the fourth result is a correct result; and
   adjusting the parameter of the current decision-making model by using the second index and the third index.

7. The method according to claim 2, wherein when determining that a loss function is converged, it is determined that the stop condition is satisfied,
   wherein the loss function is a weighted sum of a first function, a second function, and a third function, and
   wherein the first function is a mathematical expectation function representing that an authenticity attribute of the second virtual feature vector is judged to be an incorrect result by the current decision-making model; the second function is a mathematical expectation function representing that an authenticity attribute of the sample feature vector is judged to be a correct result by the current decision-making model; and the third function is a mathematical expectation function representing that a result of decision-making classification of the sample feature vector is judged to be a correct result by the current decision-making model.

8. A computer implemented method for unmanned driving behavior decision-making by using a decision-making model, wherein the decision-making model is trained by the method according to claim 1, comprising:
   acquiring currently collected target data for unmanned driving behavior decision-making, wherein the target data comprises a target image;
   extracting a target feature vector corresponding to the target data, wherein a feature vector of the target image is extracted by manifold dimension reduction; and
   obtaining a target decision-making result by inputting the target feature vector into the target decision-making model.

9. An electronic device, comprising a memory, a processor, and a computer program stored on the memory and executable on the processor, wherein the program, when executed by the processor, causes the processor to:
   acquire sample data, wherein the sample data comprises a sample image;
   extract a sample feature vector corresponding to the sample data, wherein a feature vector of the sample image is extracted by manifold dimension reduction; and
   obtain a target decision-making model by performing training in a semi-supervised learning mode based on the sample feature vector, wherein the target decision-making model is used for decision-making classification.

10. The electronic device of claim 9, wherein when obtaining a target decision-making model by performing training in a semi-supervised learning mode based on the sample feature vector, the processor is further configured to:
perform iteration of the following steps:
generating a first virtual feature vector by using a current generator;
updating the current generator based on the first virtual feature vector;
generating a second virtual feature vector by using the updated generator;
updating a current decision-making model based on the sample feature vector and the second virtual feature vector; and
when determining that a stop condition is satisfied, stopping the iteration, and using the updated decision-making model as the target decision-making model.

11. The electronic device of claim 10, wherein when updating the current generator based on the first virtual feature vector, the processor is further configured to:
obtain first output content by inputting the first virtual feature vector into the current decision-making model, wherein the first output content comprises a first result of judging an authenticity attribute of the first virtual feature vector; and
adjust a parameter of the current generator according to the first output content to update the current generator.

12. The electronic device of claim 11, wherein when adjusting the parameter of the current generator according to the first output content, the processor is further configured to:
determine a first index according to the first output content, wherein the first index represents a mathematical expectation indicating that the first result is an incorrect result; and
adjust the parameter of the current generator by using the first index.

13. The electronic device of claim 10, wherein when updating the current decision-making model based on the sample feature vector and the second virtual feature vector, the processor is further configured to:
obtain second output content by inputting the sample feature vector and the second virtual feature vector into the current decision-making model, wherein the second output content comprises a second result of judging an authenticity attribute of the second virtual feature vector, a third result of judging an authenticity attribute of the sample feature vector, and a fourth result of decision-making classification of the sample feature vector; and
adjust a parameter of the current decision-making model according to the second output content to update the current decision-making model.

14. The electronic device of claim 13, wherein when adjusting the parameter of the current decision-making model according to the second output content, the processor is further configured to:
determine a second index and a third index according to the second output content, wherein the second index represents a sum of a mathematical expectation indicating that the second result is an incorrect result and a mathematical expectation indicating that the third result is a correct result, and the third index represents a mathematical expectation indicating that the fourth result is a correct result; and
adjust the parameter of the current decision-making model by using the second index and the third index.

15. The electronic device of claim 10, wherein when determining that a loss function is converged, it is determined that the stop condition is satisfied,
wherein the loss function is a weighted sum of a first function, a second function, and a third function, and
wherein the first function is a mathematical expectation function representing that an authenticity attribute of the second virtual feature vector is judged to be an incorrect result by the current decision-making model; the second function is a mathematical expectation function representing that an authenticity attribute of the sample feature vector is judged to be a correct result by the current decision-making model; and the third function is a mathematical expectation function representing that a result of decision-making classification of the sample feature vector is judged to be a correct result by the current decision-making model.

* * * * *